April 1, 1941. C. B. GREENBERG 2,236,820
EXPANSION LINK CHAIN
Filed March 7, 1940
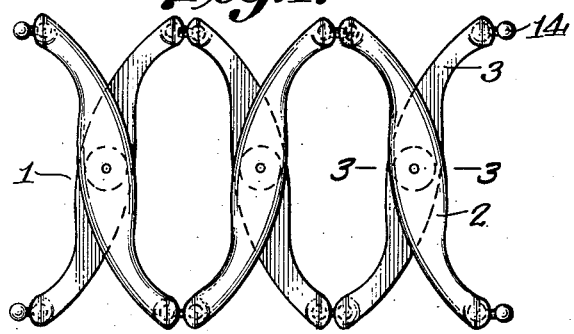
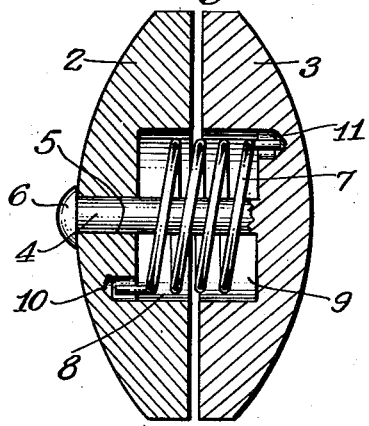
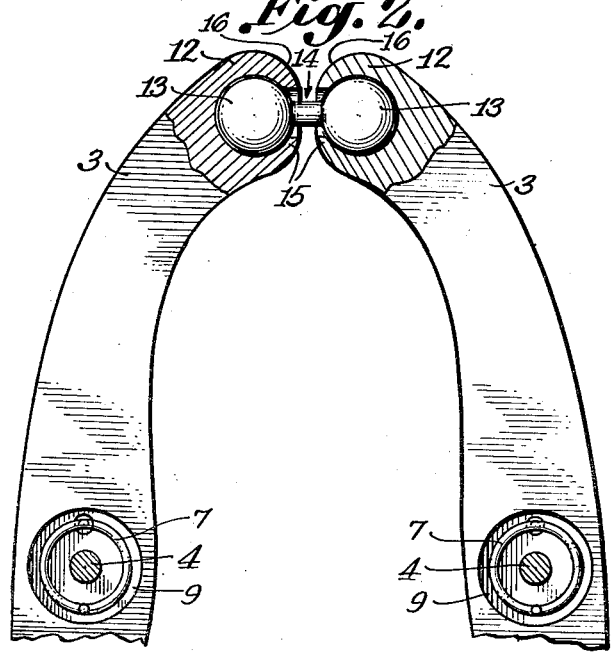
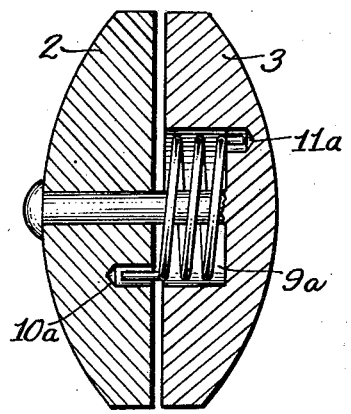
Inventor.
Charles B. Greenberg.
by William Wolfe
Attorney Patented Apr. 1, 1941

2,236,820

UNITED STATES PATENT OFFICE 2,236,820

EXPANSION LINK CHAIN

Charles B. Greenberg, New York, N. Y.

Application March 7, 1940, Serial No. 322,694

5 Claims. (Cl. 59—79)

My invention relates to link chains for bracelets and to bands for wrist watches, and in more detail, to a type of pantograph linkage capable of automatic expansion.

There are several types of pantograph link chains or straps known and manufactured in which the pantograph links are pin joined at the link tips. These joints either produce a stiff linkage and deprive the chain of flexibility or produce a shaky, weak and insecure chain and render it unsuitable for use as a bracelet or wrist watch strap. In addition the links in the chains of this type are constructed of sheet sections rolled about pre-constructed pin units thus producing a complicated, expensive and insecure structure.

The object of my invention is to construct a linkage in such a manner that although being flexible and capable of sufficient enlargement to permit it to pass about a person's hand and fit snugly on the wrist, yet it will be strong and firm. Furthermore, I intend to construct my link of solid material and with a minimum of parts so as to produce an economical, strong and attractive looking linkage.

I accomplish these and other objects by providing a linkage formed of X shaped pairs of units, each unit comprised of link pins held and spring controlled at its center, and the units consecutively fastened by ball and socket joints at the ends of each link.

Further and more specific details and objects of my invention will be shown and described in the accompanying drawing in which:

Figure 1 is a perspective view of several links of my invention.

Figure 2 is an enlarged detail partly in plan and partly with the outer parts removed showing the ball and socket joints, as well as part of the spring unit.

Figure 3 is a section through the lines 3—3 of Figure 1 showing the spring mechanism.

Figure 4 is a variation showing a different type of spring encasement.

In the drawing the chain 1 showing my invention is comprised of upper and lower link elements 2 and 3 respectively. The links are joined together by means of the pin extension 4 which extends through the opening 5 in the element 2. The end of the pin 6 is brazed over, enlarged or flat in order to hold the two elements together.

Tension is provided to hold the links in a contracted position by means of the spring 7 seated in the wells 8 and 9 of the elements 2 and 3 respectively. The spring ends are held in the recesses 10 and 11 of the wells in order to secure the spring and permit it to act on the links 2 and 3.

In Figure 4 a variation of the wells are shown by constructing only the recess 10A in the link 2 and the well seat itself 9A and its recess 11A in the element 3.

The ends of the links 2 and 3 are each provided with the sockets 12 capable of retaining the balls 13 of the dumb-bell shaped element 14. In order to secure the balls 13 in their sockets 12 the ends of the sockets are rolled inwardly about the socket openings as at 15. Of course other means of retaining the balls in the sockets such as upsetting the end of the socket using a pin can be provided and will serve the same purpose. The axes of the dumb-bell shaped elements are parallel to the axis of the chain.

In order to permit the opening and closing of the links freely and to a wide degree the ends of the sockets as shown at 16 are curved over toward the balls in the socket. This permits the linkage to be expanded without the outer parts of the sockets of one link touching the corresponding parts of the adjacent link by positioning the balls 13 close together on dumb-bell 14 and by forming the outer parts of the socket in the shape shown at 16 the ends of the sockets may be positioned near together thus providing a solid and attractive looking linkage.

As the details described in the drawing show only a few forms of my invention and since many changes and modifications may be made in the same invention without changing or departing from the spirit and scope of the basic idea, I desire to cover all modifications, forms and embodiments coming within the language of any one or more of the appended claims.

I claim:

1. A chain of link units in which each unit is comprised of two link arms crossed into an X shaped figure, one of said arms provided with an opening in its center and the other with a pin projecting through the opening in the one arm, holding means on the end of the pin retaining the arms in close contact and ball and socket joints positioned at the ends of and consecutively joining the arms, the axes of the ball and socket joints being parallel to the axis of the chain.

2. A chain of link units in which each unit is comprised of two link arms crossed into an X shaped figure and having centrally located recessed portions, holding means connecting and retaining the arms in intimate contact, ball and socket joints positioned at the ends of and consecutively joining the arms, the axes of the ball and socket joints being parallel to the axis of the chain and a coiled spring in the recess controlling the arms to hold the links in a contracted position.

3. A chain of link units in which each unit is comprised of two link arms crossed into an X shaped figure, said arms having centrally located recessed portions and each said arm terminating in partially closed ball sockets, holding means connecting and retaining the arms in close contact, ball joint elements functioning in the ball sockets and connecting consecutive link arms into chain formation, the axes of the ball and socket joints being parallel to the axis of the chain and spring means in the recessed portions functioning on the arms to normally retain the links in a contracted position.

4. A chain of link units in which each unit is comprised of two link arms crossed into an X shaped figure, said arms having centrally located recessed portions and each said arm terminating in arcuate shaped ends provided with partially closed ball sockets, pin holding means connecting and retaining the arms in intimate contact, ball joint elements, said ball sockets and ball joint elements functioning in the ball sockets being positioned along an axis parallel to the chain and coiled spring means in the recessed portions functioning against the arms to normally retain the links in a contracted position.

5. A chain of link units in which each unit is comprised of two link arms crossed into an X shaped figure, one of said arms having a centrally located recessed portion, holding means connecting and retaining the arms in intimate contact, ball and socket joints positioned at the ends of and consecutively joining the arms, the axes of the ball and socket joints being parallel to the axis of the chain and a coiled spring in the recess controlling the arms to hold the links in a contracted position.

CHARLES B. GREENBERG.